(12) United States Patent
 Bartko (10) Patent No.: US 11,032,724 B2
(45) Date of Patent: Jun. 8, 2021

(54) SYSTEM AND METHOD FOR OPTIMIZING SIGNAL PATH CALIBRATION

(71) Applicant: Rohde & Schwarz GmbH & Co. KG, Munich (DE)

(72) Inventor: Hendrik Bartko, Unterhaching (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 55 days.

(21) Appl. No.: 16/507,792

(22) Filed: Jul. 10, 2019

(65) Prior Publication Data

US 2021/0014701 A1    Jan. 14, 2021

(51) Int. Cl.
*H04W 24/02* (2009.01)
*H04W 24/08* (2009.01)

(52) U.S. Cl.
CPC ........... *H04W 24/02* (2013.01); *H04W 24/08* (2013.01)

(58) Field of Classification Search
CPC ..... H04W 24/02; H04W 24/08; H04W 24/10; H04W 16/22; H04W 16/28; G06T 7/20; G06T 17/05
See application file for complete search history.

(56) References Cited

U.S. PATENT DOCUMENTS

| 2006/0003775 | A1  | 1/2006 | Bull et al. |
| 2013/0022083 | A1* | 1/2013 | Vasseur ............... H04L 12/4035 375/132 |
| 2013/0188620 | A1  | 7/2013 | Dinan |
| 2014/0171106 | A1  | 6/2014 | Cheng et al. |
| 2019/0261193 | A1* | 8/2019 | Torsner .................. H04B 7/088 |
| 2020/0252907 | A1* | 8/2020 | Rune ..................... H04W 68/02 |

FOREIGN PATENT DOCUMENTS

| CN | 101605352 A | 12/2009 |
| CN | 105307254 A | 2/2016 |
| CN | 106231621 A | 12/2016 |
| CN | 108318861 A | 7/2018 |
| EP | 0802427 A2  | 10/1997 |
| WO | 2009132143 A1 | 10/2009 |
| WO | 2012009867 A1 | 1/2012 |

\* cited by examiner

*Primary Examiner* — Wei Zhao
(74) *Attorney, Agent, or Firm* — Ditthavong, Steiner & Mlotkowski (57) ABSTRACT

A system for optimizing signal path calibration is provided. The system comprises at least one transmitting module, at least one measuring unit, connected to the transmitting module via a signal path and a processing unit. In this context, the measuring unit is adapted to perform power measurement on the signal path. In addition, the processing unit is adapted to configure the measuring unit with respect to a predefined measurement accuracy and a predefined test time duration.

18 Claims, 5 Drawing Sheets

| Device Sensitivity (Full-Scale) | Response Time Tr | A/D Update Rate $f_{ADC}$ |
|---|---|---|
| | | |
| | | |
| | | |

SYSTEM AND METHOD FOR OPTIMIZING SIGNAL PATH CALIBRATION

TECHNICAL FIELD

The invention relates to a system and a corresponding method for optimizing signal path calibration, especially for optimizing signal path calibration in Radiated Spurious Emission (RSE) measurements for fifth generation (5G) communication standards.

BACKGROUND ART

Spurious emissions are commonly referred to unwanted radio frequency (RF) emissions that wireless devices or systems may transmit out besides carrier frequencies. Measuring spurious emissions is very important with nearly all devices under test (DUTs) that transmit RF power since the DUTs must comply with frequency-dependent limits so that they do not interfere with other radio services or transmit unwanted signals in the case of security-relevant applications. Typical DUTs of such a system are mobile phones, base stations, radio set and short-range devices. Furthermore, the frequency spectrum is a valuable resource for service providers. It is therefore crucial that network capacity should not be reduced by spurious emissions from wireless devices. Hence, radiated harmonics and other spurious emissions need to be measured in line with Third Generation Partnership Project (3GPP), European Telecommunications Standards Institute (ETSI) and US Federal Communications Commission (FCC) test specifications for cellular and other wireless standards.

To comply with the 5G communication standards, radiated spurious emissions are required to be measured up to 200 GHz. Generally, conventional power meters are only available up to 90 GHz and above that thermal power meters are used for calibrating signal paths. The use of thermal power meters imposes significant complications on path calibration since they are extremely slow and insensitive. A non-optimized path calibration disadvantageously leads to high measurement uncertainty as well as requires extremely high calibration time. A possible solution would be the user defining a calibration time beforehand with a required level of calibration accuracy.

For example, the document WO 2012/009867 A1 shows a method and a device for testing total isotropic sensitivity of a mobile terminal where a specification of required Bit Error Rate (BER) is made beforehand and the power is correspondingly determined in order to precisely achieve this BER. Although the specification of BER may improve the measurement accuracy, it does not however compensate the high calibration time required to calibrate a signal path, especially for a standard with high frequency range.

Accordingly, there is a need to provide a system and a method for optimizing signal path calibration, especially by reducing measurement uncertainty and calibration time significantly in order to optimize signal path calibration in RSE measurements for 5G communication standards.

SUMMARY OF THE INVENTION

According to a first aspect of the invention, a system for optimizing signal path calibration is provided. The system comprises at least one transmitting module, at least one measuring unit, connected to the transmitting module via a signal path and a processing unit. In this context, the measuring unit is adapted to perform power measurement on the signal path. In addition, the processing unit is adapted to configure the measuring unit with respect to a predefined measurement accuracy and a predefined test time duration. Therefore, from the standard requirements for the RSE measurement the calibration accuracy is specified beforehand. The further specification of calibration time allows a user to receive the best possible calibration during this time. Advantageously, the measurement uncertainty and calibration time are significantly reduced and thereby the signal path calibration is successfully optimized.

According to a first preferred implementation form of said first aspect of the invention, the processing unit is further adapted to calculate a measurement accuracy for the measuring unit based on the predefined test time duration. Advantageously, the best possible calibration for the predefined calibration time as well as the accuracy of the calibration is achieved, for instance as measurement output.

According to a second preferred implementation form of said first aspect of the invention, the processing unit is further adapted to optimize the calculated measurement accuracy with respect to the predefined measurement accuracy for a given test time duration. Advantageously, the measurement accuracy is further improved.

According to a further preferred implementation form of said first aspect of the invention, the processing unit is further adapted to calculate a test time duration based on the calculated measurement accuracy and the predefined measurement accuracy. Advantageously, the actual required calibration time for a specific accuracy is received, for instance as measurement output.

According to a further preferred implementation form of said first aspect of the invention, the processing unit is further adapted to optimize the calculated test time duration with respect to the predefined test time duration for a given measurement accuracy. Advantageously, the required calibration time is further optimized.

According to a further preferred implementation form of said first aspect of the invention, the processing unit is further adapted to indicate alerts for a certain predefined value of the measurement accuracy. The certain predefined value could be a specific requirement for the RSE measurement according to a specific standard. Such alerts advantageously facilitate automated calibration by notifying when a required calibration accuracy is achieved.

According to a further preferred implementation form of said first aspect of the invention, the system further comprises a user interface, preferably a graphical user interface. Furthermore, the user interface is adapted to receive user data corresponding to the predefined measurement accuracy and the predefined test time duration. Advantageously, in consort with the pre-defined set of specifications, a user can specify requirements for the calibration accuracy and calibration time in real-time, which results in a high level of measurement flexibility.

According to a further preferred implementation form of said first aspect of the invention, the transmitting module comprises switching means adapted to switch on and/or switch off the transmission of a signal via the signal path. In this context, the processing unit is further adapted to control the switching means in order to schedule the transmission of the signal via the signal path. Advantageously, the measuring unit can perform power measurements on the signal path in both cases whether the signal is transmitted (signal and noise present) or the transmission is switched off (only noise present). In addition, the processing unit can dictate burst signals via the switching means with a limited number of fixed frequency oscillations having a definite duration.

According to a further preferred implementation form of said first aspect of the invention, the processing unit is further adapted to define a transmission frequency of the signal transmitted via the signal path. Advantageously, the parameters of the transmitted signal is previously known to the processing unit and hence the detection in the measuring unit is carried out with ease.

According to a further preferred implementation form of said first aspect of the invention, the power measurement results of the measuring unit correspond to path-loss results of the signal path, preferably in terms of path-loss per frequency. Advantageously, the signal path calibration with regard to path loss is performed in a simplified manner.

According to a further preferred implementation form of said first aspect of the invention, the processing unit is further adapted to analyze scattering parameters of the measuring unit. In addition, the processing unit is further adapted to configure the measuring unit based on the scattering parameters. Advantageously, the losses and reflections introduced by any additional components and/or connecting means to the measuring unit are effectively compensated. As a result, the measurement accuracy as well as reliability are significantly improved.

According to a second aspect of the invention, a method for optimizing signal path calibration is provided. The method comprises the steps of connecting a measuring unit to a signal path to perform power measurement and configuring the measuring unit with respect to a predefined measurement accuracy and a predefined test time duration. Therefore, from the standard requirements for the RSE measurement the calibration accuracy is specified beforehand and an additional specification of calibration time results in the best possible calibration during this time. Consequently, the signal path calibration is successfully optimized.

According to a first preferred implementation form of said second aspect of the invention, the method further comprises the step of calculating a measurement accuracy for the measuring unit based on the predefined test time duration. Advantageously, the best possible calibration for the predefined calibration time as well as the accuracy of the calibration is received, for instance as measurement output.

According to a second preferred implementation form of said second aspect of the invention, the method further comprises the step of optimizing the calculated measurement accuracy with respect to the predefined measurement accuracy for a given test time duration. Advantageously, the measurement accuracy is further improved.

According to a further preferred implementation form of said second aspect of the invention, the method further comprises the step of calculating a test time duration based on the calculated measurement accuracy and the predefined measurement accuracy. Advantageously, the actual required calibration time for a specific accuracy is received, for instance as measurement output.

According to a further preferred implementation form of said second aspect of the invention, the method further comprises the step of optimizing the calculated test time duration with respect to the predefined test time duration for a given measurement accuracy. Advantageously, the required calibration time is further optimized.

According to a further preferred implementation form of said second aspect of the invention, the method further comprises the step indicating alerts for a certain predefined value of the measurement accuracy. Advantageously, such alerts facilitate automated calibration by notifying when a required calibration accuracy is achieved.

According to a further preferred implementation form of said second aspect of the invention, the method further comprises the steps of analyzing scattering parameters of the measuring unit and configuring the measuring unit based on the scattering parameters. Advantageously, the losses and reflections introduced by any additional components and/or connecting means to the measuring unit are effectively compensated.

BRIEF DESCRIPTION OF THE DRAWINGS

Exemplary embodiments of the invention are now further explained with respect to the drawings by way of example only, and not for limitation. In the drawings.

DETAILED DESCRIPTION OF PREFERRED EMBODIMENTS

Reference will now be made in detail to the embodiments of the present invention, examples of which are illustrated in the accompanying drawings. Similar entities and reference numbers in different figures have been partially omitted. However, the following embodiments of the present invention may be variously modified and the range of the present invention is not limited by the following embodiments.

Figure 1:
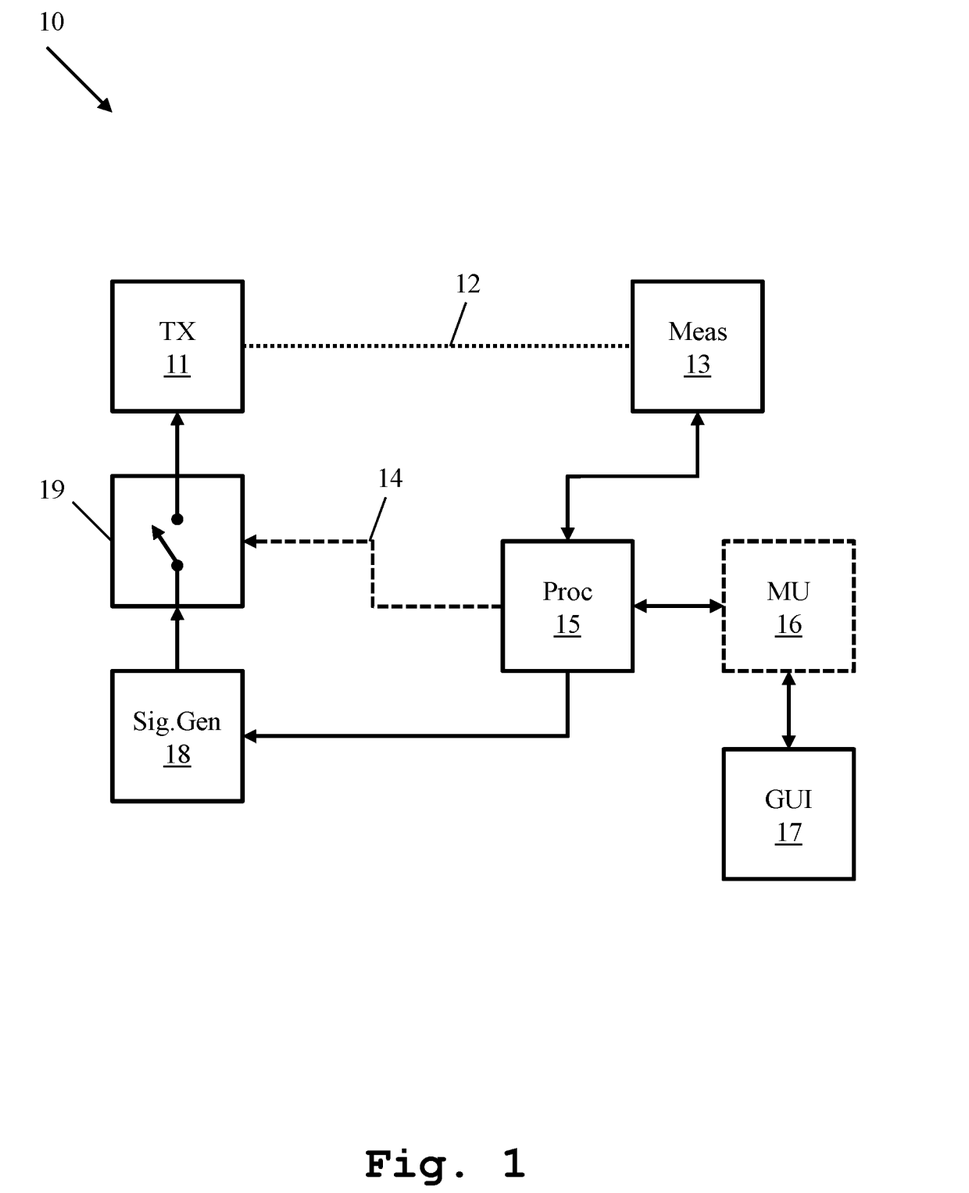
FIG. 1 shows a first exemplary embodiment of the system according to the first aspect of the invention in a block diagram.

In FIG. 1, a first exemplary embodiment of the system 10 according to the first aspect of the invention is illustrated in a block diagram. The system 10 comprises a transmitting module 11 and a measuring unit 13, where a signal path 12 is formed in-between the transmitting module 11 and the measuring unit 13. The signal path 12 can be formed conductively via RF waveguides, for instance RF cables as well as in non-conductive manner. The measuring unit 13 comprises power meters, preferably thermal power meters that are typically rated above 90 GHz and perform power measurements on the signal path 12. Additionally or alternatively, the measuring unit 13 may comprise thermal power sensors that are collectively able to perform power measurement over a wide frequency range.

The transmitting module 11 is coupled to switching means 19 followed by a signal generator 18 in order to generate a transmission signal through the signal path 12. The system 10 further comprises a processing unit 15 that controls the switching means 19 through a control signal 14 to schedule the ON/OFF state of the transmitted signal. The processing unit 15 is also able to control the signal generator 18 to manipulate the transmission frequency of the transmitted signal. In this context, the switching means 19 may comprise RF switches that are generally rated for higher frequencies and typically have lower channel density to preserve signal integrity.

Advantageously, the processing unit 15 is able to configure the measuring unit 13 with respect to a predefined measurement accuracy and a predefined test time duration. The processing unit 15 further calculates a measurement accuracy and a test time duration and optimizes the calculated calibration results for a given calibration time and a given calibration accuracy respectively. In this regard, the processing unit 15 receives power measurements from the measuring unit 13, preferably the digitized version of the power measurement data in order to perform signal processing.

The system 10 may optionally comprise a memory unit 16, connected to the processing unit 15, in order to store the power measurements and the predefined calibration requirements. As an added advantage, the processing unit 15 can store the calculated calibration results, for instance the measurement accuracy and the test time duration, and can further utilize the power measurements multiple times for correlation adjustment with respect to the calibration calculations. In this manner the reliability of the system 10 is significantly improved.

The system 10 further comprises a graphical user interface 17 connected to the memory unit 16 in case the memory unit 16 is present. If the memory unit 16 is not present, the graphical user interface 17 is directly connected to the processing unit 15. The direct connection is not necessarily required to be a wired connection, a wireless connection in the form of Wireless Local Area Network (WLAN), Web-based user interface and so on are also viable. Preferably, the graphical user interface 17 comprises menu based interfaces and direct manipulation interfaces so as to allow the users to configure the measuring unit 13 through the processing unit 15 to meet their specific requirements in diverse test circumstances. The processing unit 15 also outputs an alert signal to the graphical user interface 17 for a certain predefined value of the measurement accuracy. The alert signal may be displayed as a graphical element (icon) on the graphical user interface 17 or as a light emitting diode (LED) indication.

Figure 2:
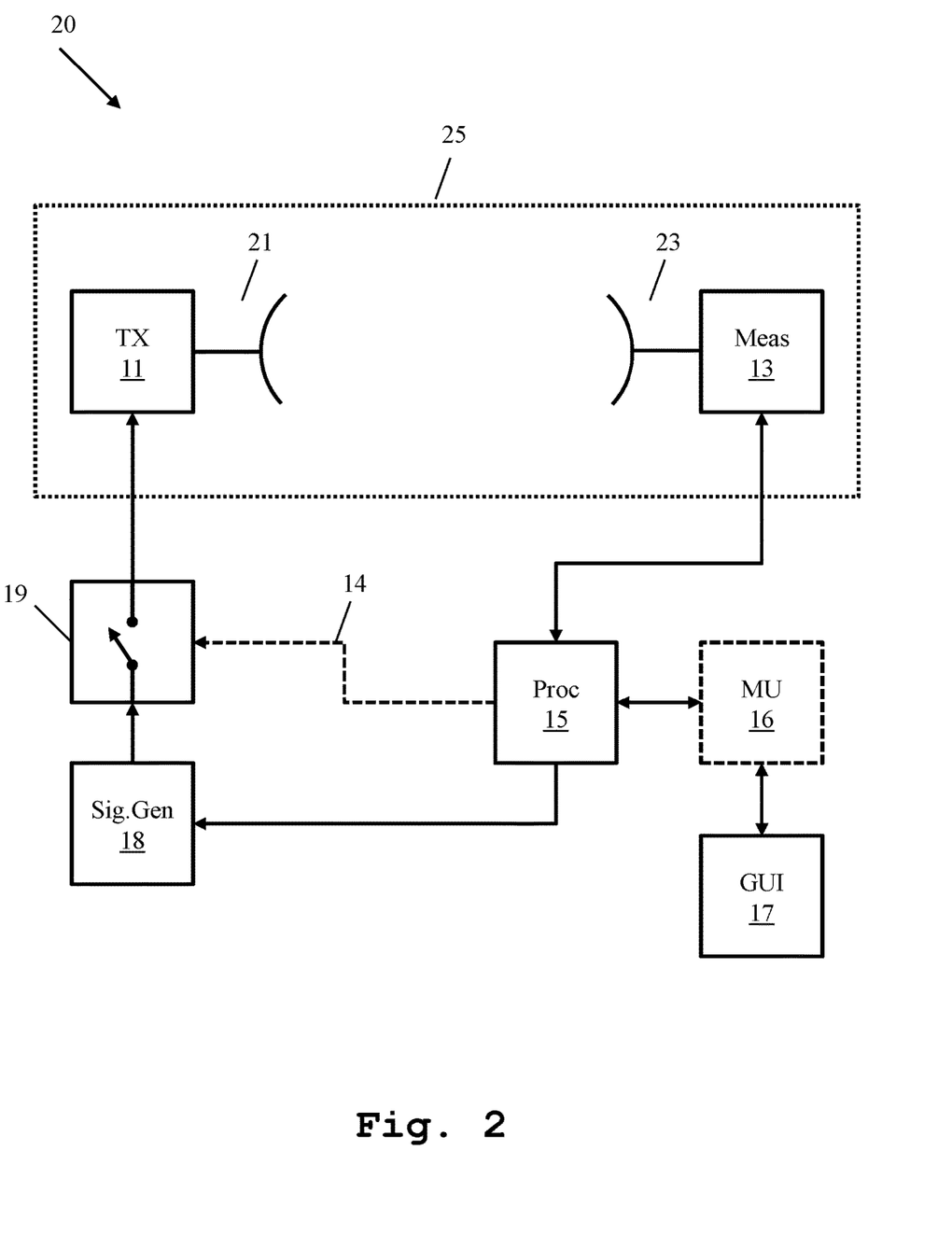
FIG. 2 shows a second exemplary embodiment of the system according to the first aspect of the invention in a block diagram.

In FIG. 2, a second exemplary embodiment of the system 20 according to the first aspect of the invention is illustrated in a block diagram. In this context, the transmitting module 11 and the measuring unit 13 each comprises a physical antenna 21, 23 and a signal path is formed between the transmit antenna 21 and the receive antenna 23 over the air. It is to be noted that the receive antenna 23 is not necessarily required to be a physical antenna 23, the measuring unit 13 can sense the signal power transmitted over the air by means of, for instance thermal power sensors. The transmitting module 11 generally comprises antenna drive circuitry closely located to the transmit antenna 21 and thereby reducing insertion loss and signal degradation. Preferably, the transmit antenna 21 is a reference antenna with known gain characteristics. Additionally, the system 20 comprises a RF chamber 25, for instance anechoic or semi-anechoic RF chamber, that encompasses the transmitting module 11, the transmit antenna 21, the measuring unit 13 and the receive antenna 23 in order to perform over the air signal path calibration.

It is particularly advantageous that the system 20 comprises the memory unit 16 since the calibration results are required to be stored and used to correct the over the air performance test results for a given RF chamber.

Figure 3:
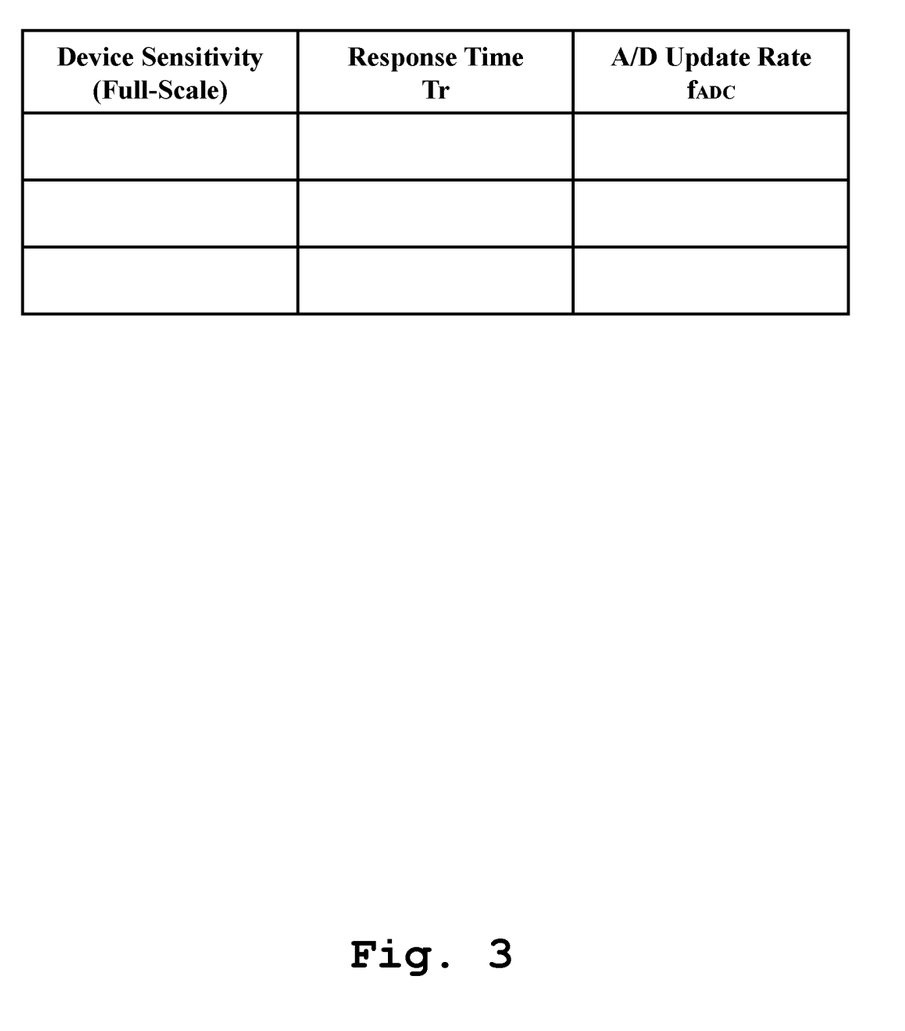
FIG. 3 shows an exemplary data input table according to the first aspect of the invention.

In FIG. 3, an exemplary data input table according to the first aspect of the invention is illustrated. In this regard, the user may input a set of device sensitivity values according to a certain standard in order to achieve a required calibration accuracy. The user may additionally input a response time and an ADC update rate as functions of the device sensitivity. The table can be previously fed to the processing unit 15 and/or stored to the memory unit 16. In addition, the user may input the data in real-time. The ADC update rate is defined as the rate at which conversions are performed when a single channel is selected and the ADC is continuously converting. Therefore, care should be taken when assigning the ADC update rate since the full-scale device sensitivity degrades as the ADC update rate is increased.

Figure 4:
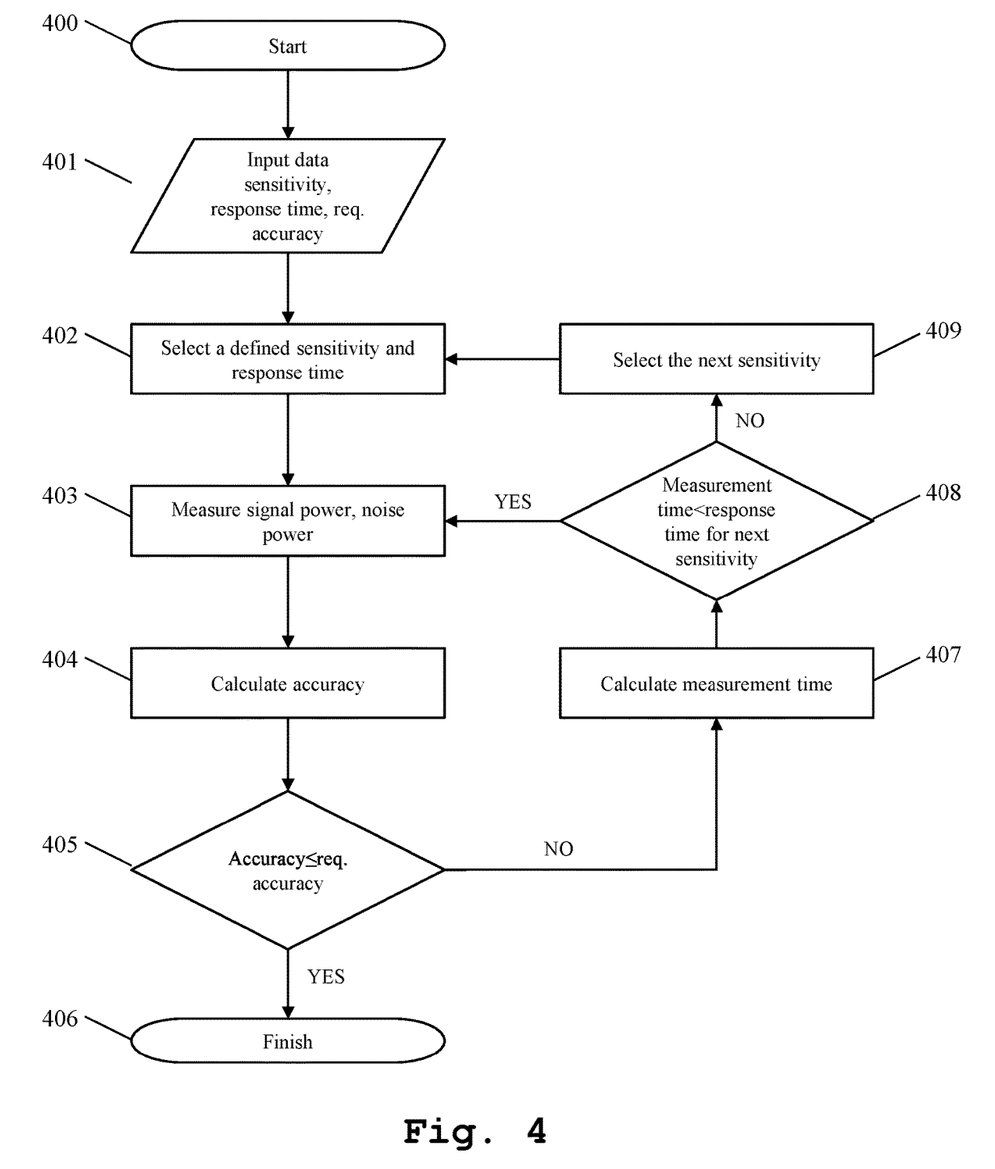
FIG. 4 shows a process flow chart of the system according to the first aspect of the invention.

In FIG. 4, a process flow chart of the system 10, 20 according to the first aspect of the invention is illustrated. Upon initiating 400 the process, the data inputted to the data input table is taken in consideration 401. The required calibration accuracy that is predefined by the processing unit 15 and/or the user can be expressed as, $$(\Delta P_{signal}/P_{signal})_{req}$$

Where, $P_{signal}$ is the separation between the means of the signal and noise distribution, and $\Delta P_{signal}$ is the standard deviation of the noise distribution.

In order to compute signal and noise distributions, power on the signal path 12 is sensed by switching on and switching off the signal transmission so as to measure cumulative signal and noise power and the sole noise power respectively. Preferably, the sampling instances are estimated upon selecting 402 a defined sensitivity and response time such that, $$M=N=T_r \times f_{ADC}$$

Where,

M is the sampling instances when the signal is switched on,

N is the sampling instances when the signal is switched off, $T_r$ is the response time corresponding to a defined sensitivity value, and $f_{ADC}$ is the ADC update rate corresponding to the defined sensitivity value.

The measurement of signal power and noise power 403 result in the respective distribution such that, M measurements with the transmitted signal on where, $P_{ON,j}$ and j=1, 2, 3 ... M N measurements with the transmitted signal off where, $P_{OFF,i}$ and i=1, 2, 3 ... N To estimate a measurement accuracy, the following calculation is performed 404 by the processing unit 15.

The separation between the means of the signal and noise distribution is calculated as, $$P_{signal} = \frac{1}{M}\sum_{j=1}^{M} P_{ON,j} - \frac{1}{N}\sum_{i=1}^{N} P_{OFF,i}$$

The standard deviation of the noise distribution is calculated as, $$\Delta P_{signal} = \sqrt{\frac{1}{M}\left(\frac{\sum_{j=1}^{M} P_{ON,j}^2}{M} - \left[\frac{\sum_{j=1}^{M} P_{ON,j}}{M}\right]^2\right) + \frac{1}{N}\left(\frac{\sum_{i=1}^{N} P_{OFF,i}^2}{N} - \left[\frac{\sum_{i=1}^{N} P_{OFF,i}}{N}\right]^2\right)}$$

Therefore, the measurement accuracy is calculated as, $$\Delta P_{signal}/P_{signal}$$

The processing unit 15 then compares 405 the calculated accuracy with respect to the predefined required accuracy to identify whether or not the calibration is optimized.

If the calculated accuracy is smaller than or equal to the required accuracy, i.e.

$$\Delta P_{signal}/P_{signal} \leq (\Delta P_{signal}/P_{signal})_{req}$$

then the required accuracy is met for the predefined test duration and the signal path calibration is successfully optimized 406.

However if the calculated accuracy is greater than the required accuracy, i.e.

$$\Delta P_{signal}/P_{signal} > (\Delta P_{signal}/P_{signal})_{req}$$

then the processing unit 15 further estimates 407 the necessary test time duration that may require in order to achieve the required accuracy based on the calculated accuracy. The predefined required accuracy may be as follows:

$$t_{meas} = (\Delta P_{signal}/P_{signal})^2 / (\Delta P_{signal}/P_{signal})_{req}^2$$

The processing unit 15 now compares 408 the estimated test time duration with respect to the response time of the next successive defined value of the sensitivity $T_{r,next}$ based on the data input table as shown in FIG. 3.

In the case when $t_{meas} < t_{r,next}$, the power measurements are carried out 403 and the process steps are repeated from 403 until the calculated accuracy value is lower than the required accuracy for the measuring unit 13.

In the case when $t_{meas} > t_{r,next}$, the processing unit 15 selects the next successive sensitivity setting 409 and starts the optimization for the newly defined sensitivity value as well as the corresponding response time. The aforementioned optimization is repeated from 402 in an analogous manner until the calculated accuracy value is lower than the required accuracy.

Figure 5:
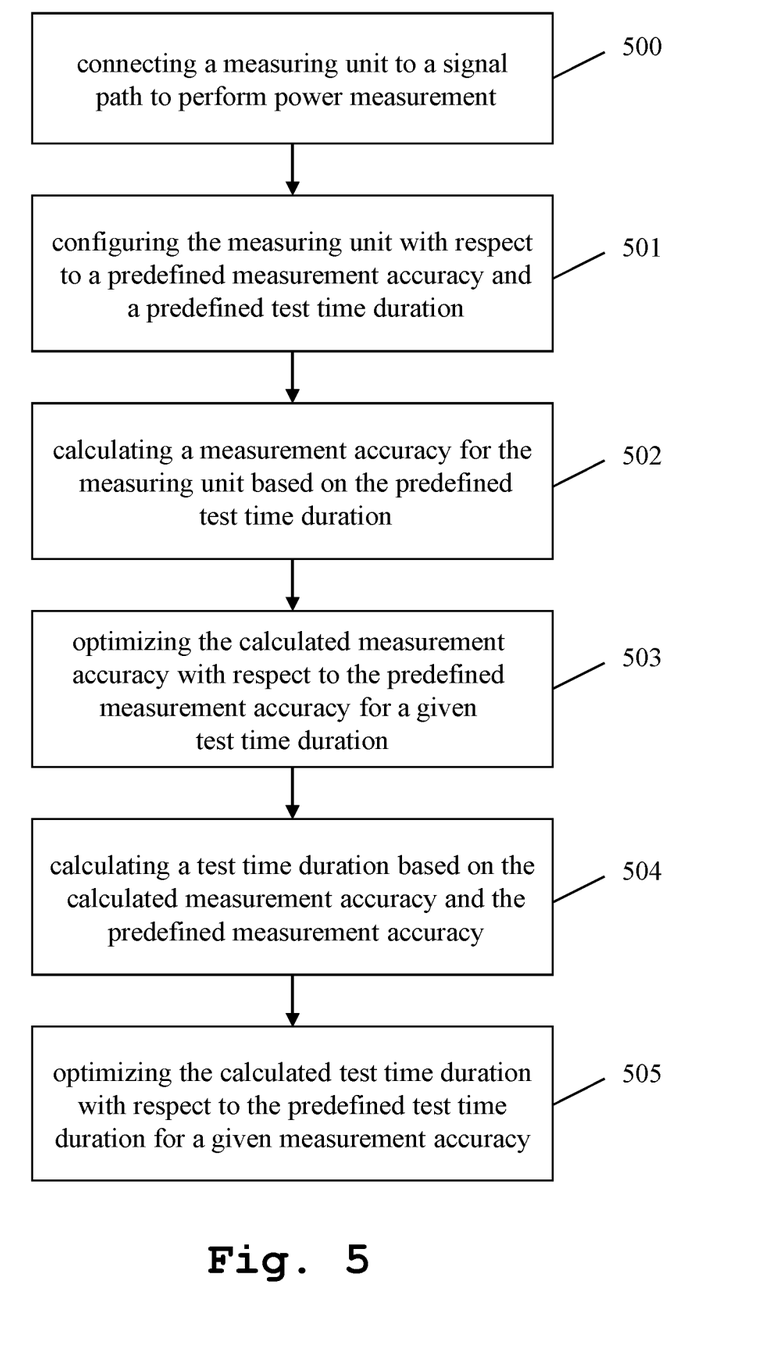
FIG. 5 shows an exemplary embodiment of the method according to the second aspect of the invention.

In FIG. 5, an exemplary embodiment of the method according to the second aspect of the invention is illustrated. In a first step 500, a measuring unit is connected to a signal path to perform power measurement. In a second step 501, the measuring unit is configured with respect to a predefined measurement accuracy and a predefined test time duration.

In a third step 502, a measurement accuracy is calculated for the measuring unit based on the predefined test time duration. In a fourth step 503, the calculated measurement accuracy is optimized with respect to the predefined measurement accuracy for a given test time duration.

In a fifth step 504, a test time duration is calculated based on the calculated measurement accuracy and the predefined measurement accuracy. Finally, in a sixth step 505, the calculated test time duration is optimized with respect to the predefined test time duration for a given measurement accuracy.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for optimizing signal path calibration comprising:
   at least one transmitting module,
   at least one measuring unit, connected to the transmitting module via a signal path, and
   a processing unit,
   wherein the measuring unit is adapted to perform power measurement on the signal path,
   wherein the processing unit is adapted to configure the measuring unit with respect to a predefined measurement accuracy and a predefined test time duration, and
   wherein the processing unit is adapted to calculate a measurement accuracy for the measuring unit based on the predefined test time duration.

2. The system according to claim 1,
   wherein the processing unit is further adapted to optimize the calculated measurement accuracy with respect to the predefined measurement accuracy for a given test time duration.

3. A system for optimizing signal path calibration comprising:
   at least one transmitting module,
   at least one measuring unit, connected to the transmitting module via a signal path, and
   a processing unit,
   wherein the measuring unit is adapted to perform power measurement on the signal path,
   wherein the processing unit is adapted to configure the measuring unit with respect to a predefined measurement accuracy and a predefined test time duration, and
   wherein the processing unit is further adapted to calculate a test time duration based on the calculated measurement accuracy and the predefined measurement accuracy.

4. The system according to claim 3,
   wherein the processing unit is further adapted to optimize the calculated test time duration with respect to the predefined test time duration for a given measurement accuracy.

5. The system according to claim 1,
   wherein the processing unit is further adapted to indicate alerts for a certain predefined value of the measurement accuracy.

6. The system according to claim 1,
   further comprising a user interface, preferably a graphical user interface.

7. The system according to claim 6,
   wherein the user interface is adapted to receive user data corresponding to the predefined measurement accuracy and the predefined test time duration.

8. The system according to claim 1,
wherein the transmitting module comprises switching means adapted to switch on and/or switch off the transmission of a signal via the signal path.

9. The system according to claim 8,
wherein the processing unit is further adapted to control the switching means in order to schedule the transmission of the signal via the signal path.

10. The system according to claim 8,
wherein the processing unit is further adapted to define a transmission frequency of the signal transmitted via the signal path.

11. The system according to claim 1,
wherein the power measurement results of the measuring unit correspond to path-loss results of the signal path, preferably in terms of path-loss per frequency.

12. A system for optimizing signal path calibration comprising:
at least one transmitting module,
at least one measuring unit, connected to the transmitting module via a signal path, and
a processing unit,
wherein the measuring unit is adapted to perform power measurement on the signal path,
wherein the processing unit is adapted to configure the measuring unit with respect to a predefined measurement accuracy and a predefined test time duration,
wherein the processing unit is adapted to analyze scattering parameters of the measuring unit, and
wherein the processing unit is adapted to configure the measuring unit based on the scattering parameters.

13. A method for optimizing signal path calibration, comprising the steps of:
connecting a measuring unit to a signal path to perform power measurement,
configuring the measuring unit with respect to a predefined measurement accuracy and a predefined test time duration, and
calculating a measurement accuracy for the measuring unit based on the predefined test time duration.

14. The method according to claim 13,
further comprising the step of optimizing the calculated measurement accuracy with respect to the predefined measurement accuracy for a given test time duration.

15. A method for optimizing signal path calibration, comprising the steps of:
connecting a measuring unit to a signal path to perform power measurement,
configuring the measuring unit with respect to a predefined measurement accuracy and a predefined test time duration, and
calculating a test time duration based on the calculated measurement accuracy and the predefined measurement accuracy.

16. The method according to claim 15,
further comprising the step of optimizing the calculated test time duration with respect to the predefined test time duration for a given measurement accuracy.

17. The method according to claim 13,
further comprising the step of indicating alerts for a certain predefined value of the measurement accuracy.

18. A method for optimizing signal path calibration, comprising the steps of:
connecting a measuring unit to a signal path to perform power measurement,
configuring the measuring unit with respect to a predefined measurement accuracy and a predefined test time duration,
analyzing scattering parameters of the measuring unit, and
configuring the measuring unit based on the scattering parameters.

* * * * *